US011014095B2

(12) United States Patent
Downie

(10) Patent No.: US 11,014,095 B2
(45) Date of Patent: May 25, 2021

(54) MAGNETIC FILTER FOR A CENTRAL HEATING SYSTEM

(71) Applicant: ADEY HOLDINGS (2008) LIMITED, Cheltenham (GB)

(72) Inventor: Simon Downie, Cheltenham (GB)

(73) Assignee: ADEY HOLDINGS (2008) LIMITED, Cheltenham (GB)

( * ) Notice: Subject to any disclaimer, the term of this patent is extended or adjusted under 35 U.S.C. 154(b) by 0 days.

(21) Appl. No.: 16/313,980

(22) PCT Filed: Jun. 30, 2017

(86) PCT No.: PCT/GB2017/051932
§ 371 (c)(1),
(2) Date: Dec. 28, 2018

(87) PCT Pub. No.: WO2018/002654
PCT Pub. Date: Jan. 4, 2018

(65) Prior Publication Data
US 2019/0224688 A1 Jul. 25, 2019

(30) Foreign Application Priority Data
Jun. 30, 2016 (GB) ...................... 1611504

(51) Int. Cl.
| *B03C 1/28* | (2006.01) |
| *C02F 1/28* | (2006.01) |
| *C02F 1/48* | (2006.01) |
| *F24D 19/00* | (2006.01) |
| *C02F 1/00* | (2006.01) |

(52) U.S. Cl.
CPC .............. *B03C 1/288* (2013.01); *C02F 1/001* (2013.01); *C02F 1/482* (2013.01); *F24D 19/0092* (2013.01); *B03C 2201/18* (2013.01)

(58) Field of Classification Search
CPC ..... B03C 1/288; B03C 2201/18; C02F 1/001; C02F 1/482; F24D 19/0092
See application file for complete search history.

(56) References Cited

U.S. PATENT DOCUMENTS 3,402,820 A * 9/1968 Lohmann ................ B03C 1/288
210/222
4,855,045 A 8/1989 Reed
(Continued)

FOREIGN PATENT DOCUMENTS

FR 3016944 A1 7/2015
GB 2257932 A 1/1993
(Continued)

*Primary Examiner* — Krishnan S Menon
*Assistant Examiner* — Waqaas Ali
(74) *Attorney, Agent, or Firm* — Jacob M. Ward; Ward Law Office LLC

(57) ABSTRACT

A magnetic filter for a central heating or cooling system comprises a pipe having an inlet end and an outlet end, and a filtration portion between the inlet and outlet ends the diameter of the filtration portion of the pipe being greater than the diameter of the inlet end of the pipe and also greater than the diameter of the outlet end of the pipe, and a magnet assembly adapted to be attachable to the pipe, around an outside surface of the filtration portion of the pipe, and movable relative to the pipe from a position close to the pipe to a position more distant from the pipe.

13 Claims, 4 Drawing Sheets

(56) References Cited

U.S. PATENT DOCUMENTS

| | | | |
|---|---|---|---|
| 4,888,113 A * | 12/1989 | Holcomb | A61N 2/06 |
| | | | 210/222 |
| 5,320,751 A | 6/1994 | Burns | |
| 5,817,233 A | 10/1998 | Cooper | |
| 5,980,479 A | 11/1999 | Kutushov | |
| 2002/0056679 A1 | 5/2002 | Sato | |
| 2008/0290038 A1 | 11/2008 | Kaitting et al. | |
| 2014/0263077 A1 * | 9/2014 | Lombardi | F28F 19/01 |
| | | | 210/695 |
| 2014/0367340 A1 | 12/2014 | Caleffi | |

FOREIGN PATENT DOCUMENTS

| | | | |
|---|---|---|---|
| GB | 2450501 A * | 12/2008 | B01D 29/66 |
| GB | 2450501 A | 12/2008 | |
| JP | 11319627 A * | 11/1999 | |
| WO | 00/03951 A1 | 1/2000 | |
| WO | 2012124460 A1 | 9/2012 | |

\* cited by examiner

MAGNETIC FILTER FOR A CENTRAL HEATING SYSTEM

CROSS-REFERENCE TO RELATED APPLICATIONS

This patent application is a United States National Stage Patent Application of International Patent Application No. PCT/GB2017/051932, filed Jun. 30, 2017, which in turn claims the benefit of Great Britain Patent Application No. 1611504.0, filed Jun. 30, 2016. The entire disclosures of the above patent applications are hereby incorporated herein by reference.

FIELD

The present invention relates to a magnetic filter for use in a heating or cooling system, particularly a large heating/cooling system with pipes having a diameter between for example around 38 mm and 150 mm.

BACKGROUND TO THE INVENTION

It is now common to fit magnetic filters in wet central heating systems. A magnetic filter improves the performance of the system by attracting and retaining magnetic particles, removing them from the system water. Magnetic particles in system water result from corrosion of radiators and other components, and if the level is allowed to build up the result is a magnetic sludge known as 'magnetite'. This can cause blockages, especially in the heat exchangers of modern high-efficiency boilers, and reduce the efficiency of the system by building up in radiators, reducing the rate of heat transfer out of the radiator.

For domestic central heating systems, magnetic filters are generally provided in the form of a chamber, often made from plastics, with an inlet and an outlet and a magnet within the chamber. An example of this type of magnetic filter is disclosed in GB2491246.

Filters are also available for larger systems, which use 2 inch (around 50 mm) or greater diameter pipe for the heating circuit(s). For example, the filters sold under the trade mark "Magnaclean® Commercial" fit into this category. These filters are in the form of a large, heavy, cast container, with an inlet and an outlet on either side, a removable lid, and magnets extending into the container to attract and retain magnetic particles from system water as it passes through the filter. These large filters are typically connected into the heating circuit by providing flanges around the inlet and the outlet, and similar flanges on the heating circuit pipework. The pipework can then be attached to the filter by bolting the flanges of the pipework to the flanges of the filter.

These large filters are expensive to manufacture, due to the number of different parts and the amount of welding required to assemble the filter. It is an object of the present invention to provide a lower-cost alternative.

STATEMENT OF INVENTION

According to the present invention, there is provided a magnetic filter for use in a central heating or cooling system, the magnetic filter comprising:

a pipe having an inlet end and an outlet end, and a filtration portion between the inlet and outlet ends, the diameter of the filtration portion of the pipe being greater than the diameter of the inlet end of the pipe and greater than the diameter of the outlet end of the pipe, and a magnet assembly adapted to be attachable to the pipe, around an outside surface of the filtration portion of the pipe, and movable relative to the pipe from a position close to the pipe to a position more distant from the pipe.

The magnet assembly may be altogether removable from the pipe, or alternatively may be retained on the pipe, for example on a hinge or pivot to allow movement of the magnet assembly relative to the pipe.

The magnetic filter of the invention is simpler to manufacture than the known "commercial" sized filters, and therefore can be supplied at lower cost. In one embodiment, the pipe, including the inlet, outlet and filtration portions, is cast in a single piece. In some embodiments, flanges may be separate parts attached to the inlet and outlet ends by welding.

Preferably, the walls of the filtration portion of the pipe are made up of a number of substantially flat sections. As an example, the cross-section of the filtration portion may be substantially octagonal or hexagonal, with a number of flat wall sections of the filtration portion of the pipe. The removable magnet assembly may comprise a number of magnetic elements, each magnetic element being disposed against one of the flat sections of wall when the magnet assembly is installed around the filtration portion of the pipe. This puts the magnetic elements in close contact with the outer shell to maximise the strength of the magnetic field inside the filtration portion of the pipe.

The pipe is preferably manufactured from stainless steel, for example grade 304 or 316. Stainless steel is very difficult to permanently magnetise, but conducts magnetic flux very well. It is also resistant to corrosion. These properties make it an ideal material for this application, because the magnetic field strength is maximised when the magnet is installed, but there is little or no residual magnetic field strength when the magnet is removed. As an alternative, the pipe may be made from brass.

In use, with the magnet installed, magnetic particles in water flowing from the inlet to the outlet will be attracted by the magnet, and will stick to the inside of the wall of the filtration portion of the pipe. When the filter is serviced, these particles can be removed, for example by shutting off valves to isolate the filter from the rest of the heating circuit, removing the magnet assembly, opening a drain, and then opening one of the valves so that water is forced through the filter and out of the drain, under the pressure of the heating circuit, to flush out the magnetic particles captured by the filter. The valves and drain may be provided as part of the filter, or alternatively may be installed on the pipework immediately adjacent the inlet and outlet of the filter.

Preferably, an air vent is provided, either as part of the filter or as part of the pipework immediately surrounding the filter. The air vent allows excess air to be removed from the system, or allows air ingress into the filer for controlled draining of fluid.

The larger diameter pipe in the filtration portion serves two purposes. Firstly, it provides space for captured magnetic particles to collect, without creating a flow restriction in the central heating circuit. Preferably, the magnetic elements are chosen to ensure that magnetic particles will be attracted and retained until the filter is full, meaning that the layer of magnetite around the inner surface of the filtration portion of pipe reduces the diameter of the filtration portion of pipe to about the same diameter as the inlet and outlet portions. Once the filter is full, further magnetic particles will not be captured until the filter is cleaned out. A magnetic element which is too strong would continue to capture magnetic particles to a point where the diameter of the filtration portion of the pipe was reduced to such an extent that a substantial and disadvantageous restriction was put on the flow in the heating circuit.

The larger diameter of the filtration portion also decreases the flow velocity near the magnets. This increases the effectiveness with which magnetic particles can be attracted out of the flow and retained against the inner wall of the filtration portion.

The transition between the small diameter inlet and the larger diameter filtration portion of pipe preferably has a smooth curved profile. This reduces eddies and reverse flows. Likewise, the transition between the large diameter filtration portion and the small diameter outlet portion is preferably a similar smooth curved profile. In many embodiments, there will be no structural difference between the inlet and the outlet sides of the pipe, i.e. the filter is substantially symmetrical and can be installed either way around.

Preferably, the magnet assembly comprises a plurality of magnetic elements in a clamshell arrangement. Each magnetic element is preferably a substantially rectangular section, but alternatively each magnetic element could be an array of magnets, each magnet being for example cylindrical or toroidal. The magnetic elements could each comprise several magnets held in a carrier.

The clamshell magnet assembly preferably comprises two substantially rigid sections connected to each other at a hinge. The assembly can be moved about the hinge to open or close the clamshell, for installation and removal from the filtration portion of the pipe. Preferably, a screw is provided opposite the hinge, for retaining the clamshell in the open or closed position, as required, and for facilitating opening and closing.

Each rigid clamshell section may be made from moulded plastic, or alternatively formed from stainless steel sheet. Other suitable materials and manufacturing techniques may also be used. More than two rigid sections may be provided, connected by hinges. One possible embodiment is to mount each magnetic element to a single flexible sheet which can be 'wrapped' around the filtration portion of pipe. In this embodiment, the flexible sheet effectively forms a live hinge between each magnetic element.

DESCRIPTION OF THE DRAWINGS

For a better understanding of the present invention and to show more clearly how it may be carried into effect, preferred embodiments will now be described with reference to the accompanying drawings, in which.

DESCRIPTION OF A PREFERRED EMBODIMENT

Figure 1:
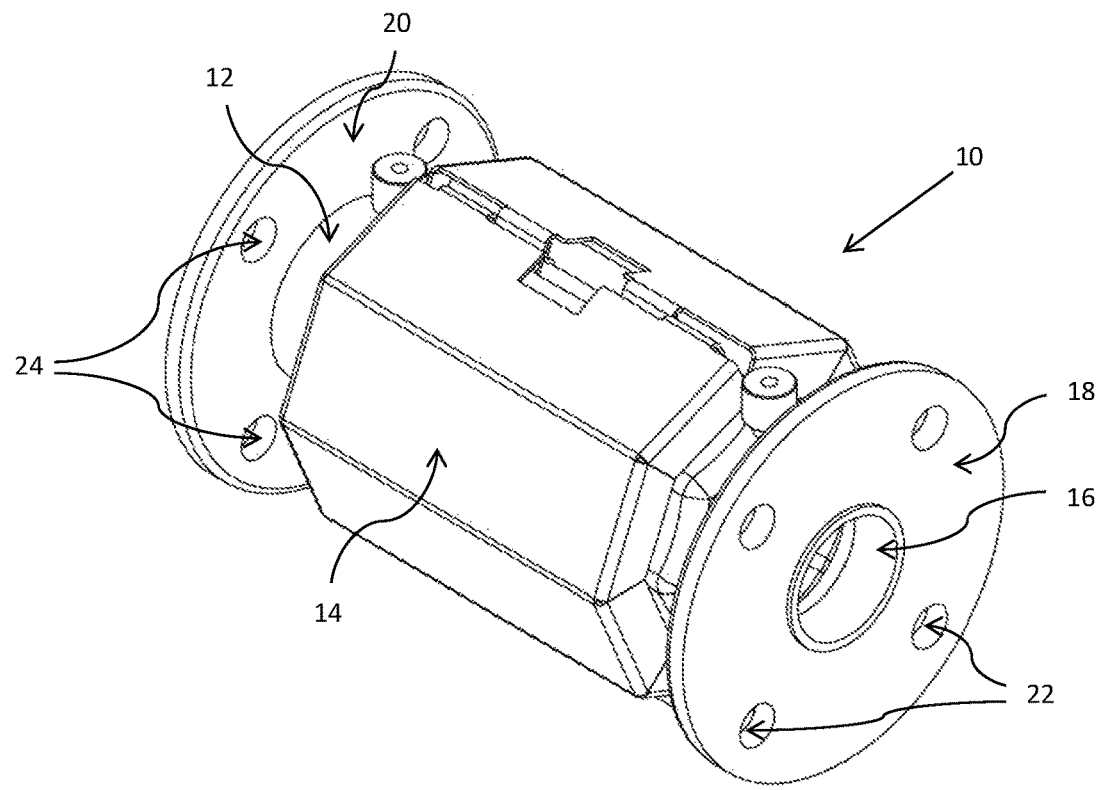
FIG. 1 is a perspective view of a magnetic filter according to the invention, with a magnet assembly installed.

Referring firstly to FIG. 1, a magnetic filter for a central heating system is indicated generally at 10. The magnetic filter comprises a stainless steel cast filter body 12, and a magnet assembly 14 which is attached to the filter body 12 in FIG. 1.

Figure 5:
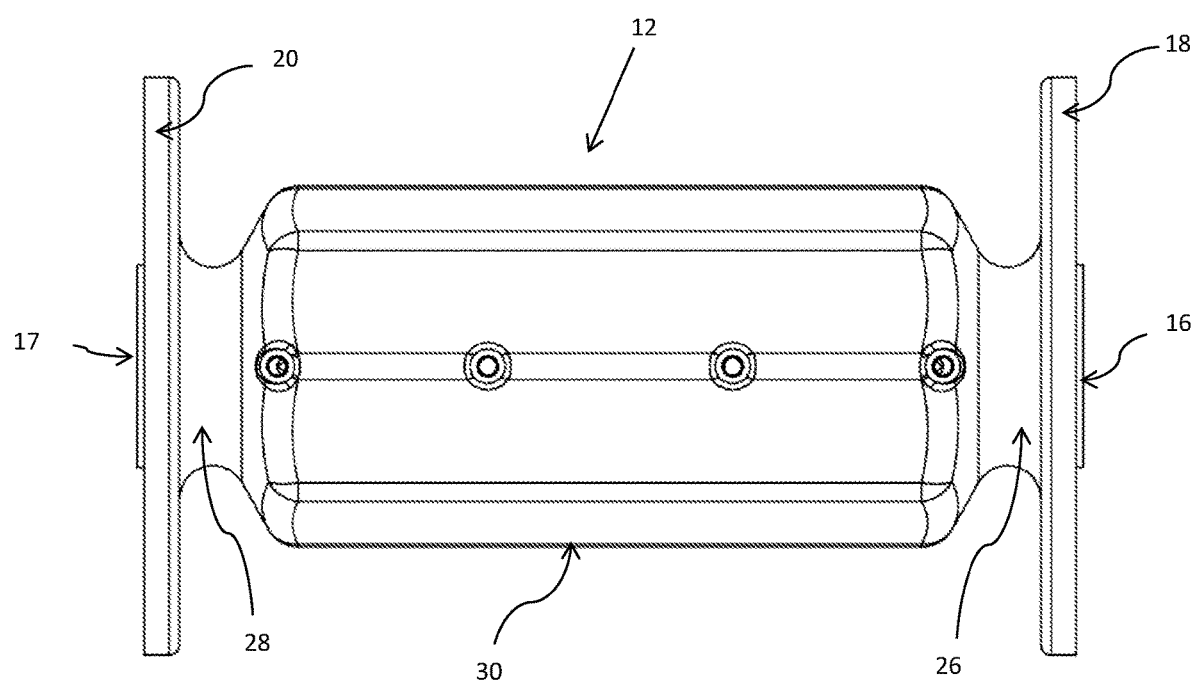
FIG. 5 is a plan view of a filter body which forms part of the magnetic filter of FIG. 1.

The filter body 12 is in the form of a pipe, having an inlet 16 and an outlet (17, see FIG. 5). The inlet and outlet are disposed along the same line, so that water passes through the filter body 12 in substantially a straight line in use. In this embodiment, the inlet 16 and the outlet (17) are identical to each other and indistinguishable, so that in fact the port indicated at 16 could be used as the outlet, and the port (17) at the back of the body 12 in the Figure could be used as the inlet. A flange 18 surrounds the inlet 16, and a similar flange 20 surrounds the outlet (17). Each flange is provided with apertures 22, 24 to allow the filter body 12 to be bolted on to flanged pipework of a central heating system circuit.

The structure of the filter body 12 can be seen most readily in FIG. 5. The filter body 12 is in the form of a pipe having an inlet portion 26 an outlet portion 28, and a filtration portion 30. The inlet portion and outlet portion 26, 28 are of similar diameter, but the filtration portion 30 has a significantly larger diameter. The inlet and outlet portions 26, 28 are substantially cylindrical, whereas the filtration portion 30 in this embodiment has an octagonal profile. Other profiles are possible for the filtration portion, but a shape having multiple flat surfaces is preferred, for example an octagonal prism as is this embodiment, or a hexagonal prism, or another shape.

Inlet portion 26 transitions into the filtration portion 30 in a continuous smooth curve, and likewise the outlet portion 28 also transitions into the filtration portion 30 in a continuous smooth curve. Although the inner surface is not shown in the figures, it will be understood that the inner surface of the pipe 12 closely follows the path of the outer surface. The smooth transition from the small diameter portions 26, 28 to the large diameter portion 30 minimises eddies and reverse flows, so that water can flow from the inlet 16 to the outlet 17 with substantially no restriction.

Figure 2:
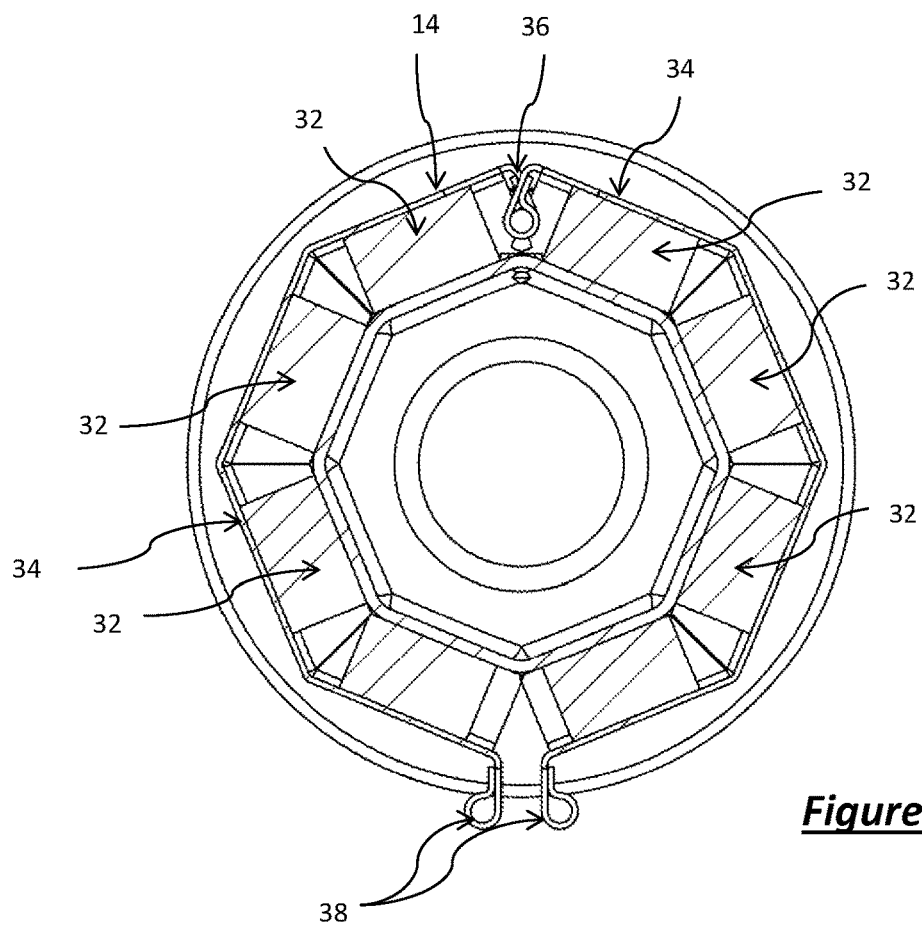
FIG. 2 is a cross section through the magnetic filter of FIG. 1.
Figure 3:
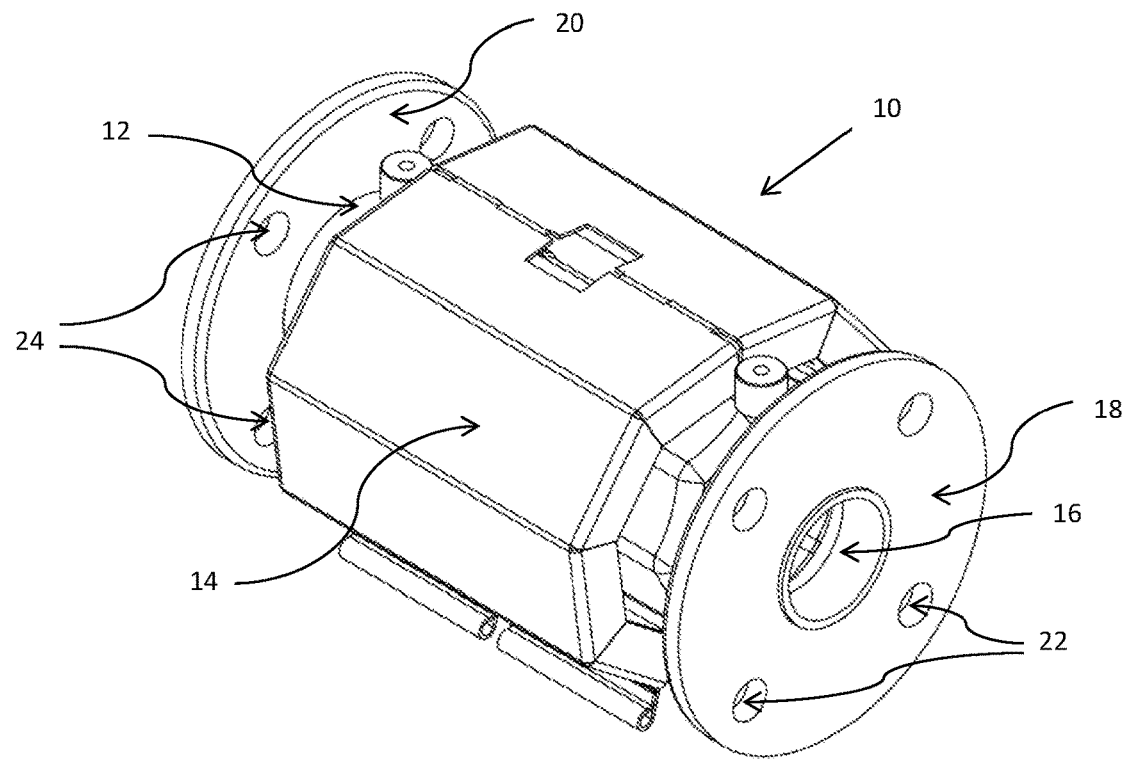
FIG. 3 is a perspective view of the magnetic filter of FIG. 1, with the clamshell magnet assembly opened for removal.
Figure 4:
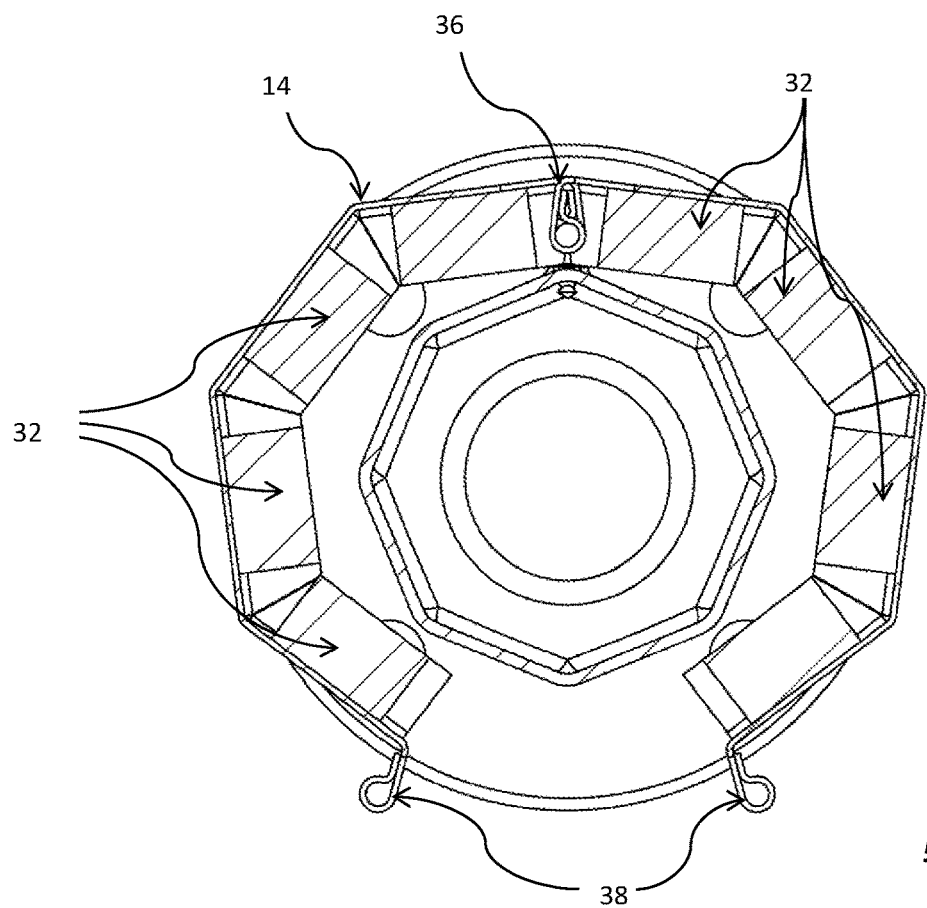
FIG. 4 is a cross section through the magnetic filter of FIG. 3.

As seen in FIGS. 1 to 4, the magnet assembly 14 in this embodiment comprises eight substantially rectangular magnetic elements 32. Four magnetic elements 32 are attached to the inside of each of two rigid casing pieces 34. In this embodiment, each rigid casing piece 34 is made from a stainless steel plate which is bent to follow the outer surface of half of the octagonal filter section 30 of the housing 12. The two rigid casing pieces 34 are attached to each other at a hinge 36 so that the pieces can pivot away from each other, as shown in FIGS. 3 and 4, or towards each other, as shown in FIGS. 1 and 2.

Although not shown in the drawings, a screw is preferably provided, passing through threaded apertures on end portions 38 of each rigid casing piece 34. The screw keeps the two parts 34 of the magnet assembly 14 together at the ends opposing the position of the hinge 36, when the magnet assembly is installed in position over the filtration portion 30 of the filter body 12. When the magnet assembly 14 needs to be removed from the filter body 12, the screw can be removed and the magnet assembly 'clamshell' 14 opened out.

Figure 6:
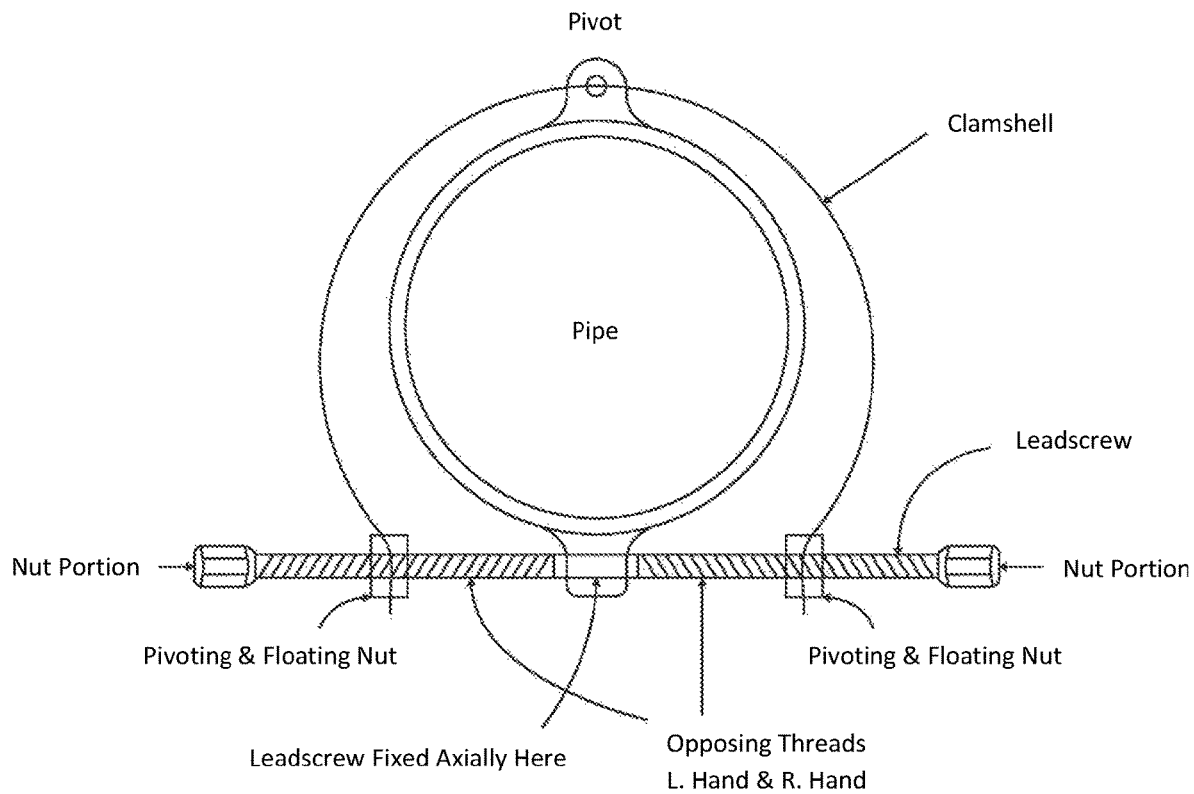
FIG. 6 shows an alternative embodiment in which the magnet assembly remains retained on a pipe, but can be moved from a position close to the pipe to a position more distant from the pipe.

FIG. 6 shows an alternative embodiment in which the magnet assembly remains retained on the pipe, but can be moved from a position close to the pipe to a position more distant from the pipe. To achieve this, a leadscrew may be fixed axially to a mounting point on the filter body, and a traversing/floating nut may be provided as part of each of the end portions of the rigid casing pieces of the magnet assembly. The leadscrews therefore open out the magnet assembly when turned. The magnet assembly remains attached to the filter body, but the magnetic elements move away from the filter body when the assembly is opened. This allows magnetite to be flushed out of the filter as long as the magnetic elements are moved far enough away from the filter body that minimal magnetite is attracted to the inner walls of the filter. One advantage of this arrangement is that the leadscrew provides a mechanical advantage when opening and closing the clamshell magnet arrangement, which may be useful if the hinge has become stiff, after a long period of non-use.

The filter of the invention is cheap and simple to manufacture compared with previous designs. It is envisaged that most of the filter body 12 can be cast from stainless steel in one piece, or alternatively three pieces where the flanges 18, 20 are welded on to the pipe 12. The construction of the magnet assembly 14 is also relatively simple, and since the magnet assembly 14 sits outside the pipe in use, there is no complex sealing required to protect the magnet from corrosion. The large diameter filtration portion 30 ensures effective filtration by reducing the velocity of flow past the magnet, and ensuring that the flow path is not blocked by captured magnetite.

The embodiments described above are provided by way of example only, and various changes and modifications will be apparent to persons skilled in the art without departing from the scope of the present invention as defined by the appended claims.

The invention claimed is:

1. A magnetic filter for a central heating or cooling system, the magnetic filter comprising:
a pipe having an inlet end and an outlet end, and a filtration portion between the inlet and outlet ends, the diameter of the filtration portion of the pipe being greater than the diameter of the inlet end of the pipe and also greater than the diameter of the outlet end of the pipe, and
a magnet assembly for attracting magnetic particles in fluid flowing through the filter, and retaining the magnetic particles in the filtration portion, the magnet assembly being attached to the pipe, around an outside surface of the filtration portion of the pipe, the magnet assembly being retained on the pipe on a hinge or pivot to allow movement of the magnet assembly relative to the pipe, and the magnet assembly being movable relative to the pipe from a position close to the pipe to a position more distant from the pipe,
wherein the magnet assembly has at least two substantially rigid magnetic elements connected to each other at the hinge or pivot in a clamshell arrangement.

2. The magnetic filter of claim 1, in which the pipe is cast in a single piece.

3. The magnetic filter of claim 1, in which the filtration portion of the pipe has a plurality of walls, each of the walls being a flat section.

4. The magnetic filter of claim 3, in which the cross-section of the filtration portion of the pipe is hexagonal or octagonal.

5. The magnetic filter of claim 3, in which the magnet assembly comprises a plurality of magnetic elements, each magnetic element being disposed against one of the plurality of walls when the magnet assembly is installed around the filtration portion of the pipe.

6. The magnetic filter of claim 1, in which the pipe is made from stainless steel.

7. The magnetic filter of claim 6, in which the pipe is made from stainless steel grade 304 or 316.

8. The magnetic filter of claim 1, in which the smaller diameter inlet end transitions to the larger diameter filtration portion in a smooth curved profile, and in which the larger diameter filtration portion transitions to the smaller diameter outlet end in a smooth curved profile.

9. The magnetic filter of claim 1, in which each magnetic element has a rectangular cross-section.

10. The magnetic filter of claim 1, in which each magnetic element comprises a plurality of magnets held in a carrier.

11. The magnetic filter of claim 1, in which retaining means are provided for holding the magnet assembly in a substantially closed position.

12. The magnetic filter of claim 1, in which each rigid section is made from moulded plastic.

13. The magnetic filter of claim 1, in which each rigid section is made from stainless steel sheet.

\* \* \* \* \*